(12) United States Patent
Kato et al.

(10) Patent No.: US 9,004,527 B2
(45) Date of Patent: Apr. 14, 2015

(54) CURTAIN AIR BAG SYSTEM

(75) Inventors: Hideki Kato, Nisshin (JP); Yosuke Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 14 days.

(21) Appl. No.: 13/431,353

(22) Filed: Mar. 27, 2012

(65) Prior Publication Data

US 2012/0248751 A1    Oct. 4, 2012

(30) Foreign Application Priority Data

Mar. 28, 2011 (JP) ................. 2011-069734

(51) Int. Cl.
*B60R 21/232* (2011.01)
*B60R 21/2334* (2011.01)

(52) U.S. Cl.
CPC .......... *B60R 21/232* (2013.01); *B60R 21/2334* (2013.01)

(58) Field of Classification Search
USPC ............................................. 280/729, 730.2
See application file for complete search history.

(56) References Cited

U.S. PATENT DOCUMENTS

| | | | | |
|---|---|---|---|---|
| 6,129,377 | A * | 10/2000 | Okumura et al. ........... | 280/730.2 |
| 6,158,767 | A * | 12/2000 | Sinnhuber ................. | 280/730.2 |
| 6,394,487 | B1 | 5/2002 | Heudorfer et al. | |
| 7,350,804 | B2 * | 4/2008 | Bakhsh et al. ............ | 280/730.2 |
| 7,556,286 | B2 * | 7/2009 | Powals ...................... | 280/730.2 |
| 8,025,308 | B2 * | 9/2011 | Fletcher et al. ........... | 280/730.2 |
| 2002/0096863 | A1 * | 7/2002 | Tanase et al. ............. | 280/730.2 |
| 2002/0167154 | A1 * | 11/2002 | Nakanishi ................. | 280/730.2 |
| 2002/0180192 | A1 * | 12/2002 | Tanase et al. ............. | 280/730.2 |
| 2004/0075257 | A1 * | 4/2004 | Ogawa et al. ............. | 280/730.2 |
| 2004/0094938 | A1 * | 5/2004 | Ryu .......................... | 280/730.2 |
| 2004/0100077 | A1 | 5/2004 | Ogata | |
| 2004/0119270 | A1 * | 6/2004 | Gu et al. ................... | 280/730.2 |
| 2004/0178609 | A1 * | 9/2004 | Totsuka et al. ............ | 280/730.2 |
| 2004/0212179 | A1 * | 10/2004 | Aoki et al. ................ | 280/730.2 |
| 2004/0251666 | A1 * | 12/2004 | Shaker et al. ............. | 280/730.2 |
| 2005/0082797 | A1 * | 4/2005 | Welford et al. ........... | 280/730.2 |
| 2005/0189743 | A1 * | 9/2005 | Bakhsh et al. ............ | 280/730.2 |
| 2005/0248134 | A1 * | 11/2005 | Heigl ........................ | 280/730.2 |
| 2005/0275200 | A1 * | 12/2005 | Noguchi et al. .......... | 280/730.2 |
| 2005/0285378 | A1 * | 12/2005 | Noguchi et al. .......... | 280/730.2 |
| 2007/0052212 | A1 * | 3/2007 | Powals ...................... | 280/729 |

(Continued)

FOREIGN PATENT DOCUMENTS

JP    2001-171471 A    6/2001
JP    2002067863 A     3/2002

(Continued)

*Primary Examiner* — Paul N Dickson
*Assistant Examiner* — Barry Gooden, Jr.
(74) *Attorney, Agent, or Firm* — Gifford, Krass, Sprinkle, Anderson & Citkowski, P.C.

(57) ABSTRACT

A curtain air bag system includes a curtain air bag that is housed folded up in an upper edge portion of a door opening, and that includes a first deployment portion that deploys when a vehicle is collided with in a side collision as well as when the vehicle rolls over, and a second deployment portion that deploys at least when the vehicle rolls over, by receiving a supply of gas. The first deployment portion deploys in a cylindrical shape extending in a vehicle longitudinal direction, above a belt line such that a rear end side of the first deployment portion overlaps with a center pillar when viewed from a side of the vehicle, and the second deployment portion deploys such that a lower end extends below the belt line, in a position not overlapping with the first deployment portion when viewed from the side.

14 Claims, 5 Drawing Sheets

(56) References Cited

U.S. PATENT DOCUMENTS

| | | | |
|---|---|---|---|
| 2012/0098240 A1* | 4/2012 | Kato et al. | 280/730.2 |
| 2012/0235390 A1* | 9/2012 | Kraft et al. | 280/730.2 |
| 2012/0248749 A1* | 10/2012 | Sato et al. | 280/730.2 |
| 2012/0248751 A1* | 10/2012 | Kato et al. | 280/730.2 |
| 2012/0256401 A1* | 10/2012 | Kato et al. | 280/730.2 |
| 2012/0256402 A1* | 10/2012 | Kato et al. | 280/730.2 |
| 2012/0299275 A1* | 11/2012 | Saimura et al. | 280/729 |
| 2012/0313356 A1* | 12/2012 | Saimura et al. | 280/730.2 |

FOREIGN PATENT DOCUMENTS

| | | |
|---|---|---|
| JP | 2004175225 A | 6/2004 |
| JP | 2004299483 A | 10/2004 |
| JP | 2007-161163 A | 6/2007 |
| JP | 2007-161167 A | 6/2007 |
| JP | 2007-216819 A | 8/2007 |
| JP | 4550729 B | 7/2010 |
| WO | 2007/055420 A1 | 5/2007 |
| WO | 2008/065965 A1 | 6/2008 |

\* cited by examiner

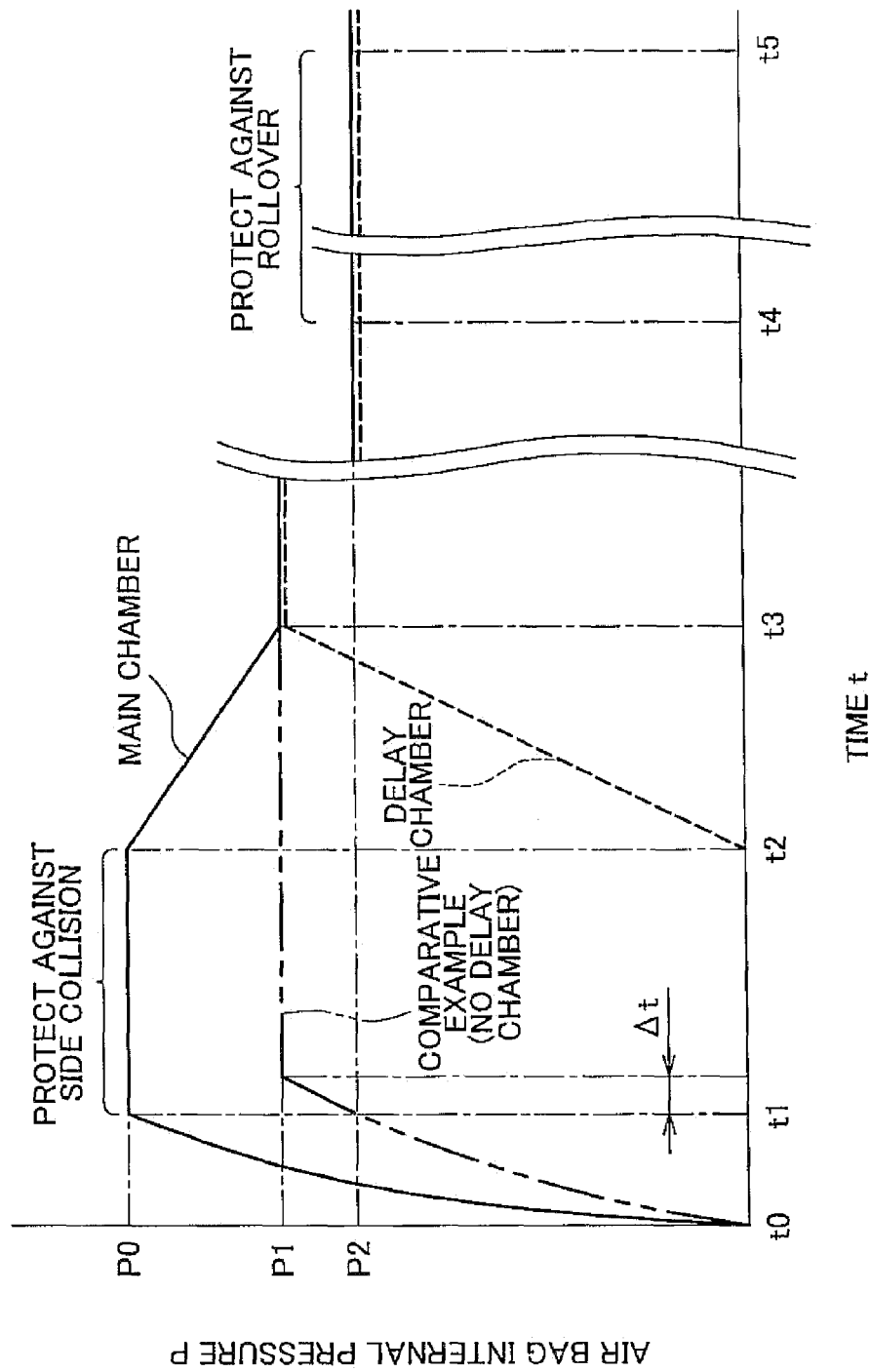

CURTAIN AIR BAG SYSTEM

CROSS REFERENCE TO RELATED APPLICATIONS

This application claims priority to Japanese Patent Application No. 2011-069734 filed on Mar. 28, 2011, which is incorporated herein by reference in its entirety including the specification, drawings and abstract.

BACKGROUND OF THE INVENTION

1. Field of the Invention

The invention relates to a curtain air bag system.

2. Description of Related Art

Japanese Patent Application Publication No. 2007-161163 (JP 2007-161163 A), for example, describes a curtain air bag system that includes a main inflating portion provided at an area where an occupant sits, and an auxiliary inflating portion that is always communicated with the main inflating portion via a narrowed portion and that is provided in an area away from where the occupant sits (i.e., in an area that does not include right beside an occupant). Also, Japanese Patent Application Publication No. 2007-161167 (JP 2007-161167 A), for example, describes technology in which, in a curtain air bag, a second deployment portion that extends down below a belt line is provided in an area aside from where an occupant sits.

However, when protecting an occupant against a rollover by a curtain air bag, it is desirable to deploy the curtain air bag in a deployed shape suitable for protecting the occupant.

SUMMARY OF THE INVENTION

The invention provides a curtain air bag system capable of improving occupant protection performance when a vehicle rolls over.

A first aspect of the invention relates to a curtain air bag system that includes a curtain air bag that is housed folded up in an upper edge portion of an opening for getting into and out of a vehicle in a vehicle body. The curtain air bag includes a first deployment portion that inflates by receiving a supply of gas when the vehicle is collided with in a side collision as well as when the vehicle rolls over, and deploys in a cylindrical shape extending in a vehicle longitudinal direction, above a belt line so as to overlap with a pillar when viewed from a side of the vehicle, and a second deployment portion that, in response to receiving a supply of gas, deploys such that a lower end extends below the belt line, in a position not overlapping with the first deployment portion when viewed from the side of the vehicle, at least when the vehicle rolls over.

With the curtain air bag of this first aspect, when the vehicle is collided with in a side collision, the first deployment portion deploys by receiving a supply of gas, such that the head of an occupant is protected from impact of the side collision by the first deployment portion. Meanwhile, when the vehicle rolls over, the first deployment portion and the second deployment portion deploy, which enables the head of an occupant to be inhibited from moving toward the outside in the vehicle width direction, along a wide area in the vehicle longitudinal direction by the first and second deployment portions.

Here, with this curtain air bag system, reaction force for restricting movement of the head of an occupant toward the outside in the vehicle width direction when a rollover occurs is supported by a side door (a portion below the belt line) at the second deployment portion, and is supported by a pillar at the first deployment portion. The first deployment portion forms a cylindrical shape that extends in the vehicle longitudinal direction, so the reaction force is effectively supported by interference with the pillar, such that occupant head protection performance is improved.

In this way, the curtain air bag system according to the first aspect enables occupant protection performance when a vehicle rolls over to be improved.

In the curtain air bag system according to the first aspect, the first deployment portion may include a front seat deployment portion that deploys in a cylindrical shape extending in the vehicle longitudinal direction beside an occupant in a vehicle front seat and above the belt line, such that a rear end side of the first deployment portion in the vehicle longitudinal direction overlaps with a center pillar when viewed from the side, and the second deployment portion may include at least a front deployment portion that deploys in a cylindrical shape extending in a vertical direction, in front of the front seat deployment portion and below a front pillar.

With the curtain air bag system having this structure, at the first deployment portion, reaction force for restricting movement of the head of an occupant toward the outside in the vehicle width direction when a rollover occurs is well supported by the rear end side of the cylindrical front seat deployment portion that extends in the vehicle longitudinal direction interfering with the center pillar. Also, at the second deployment portion, reaction force for restricting movement of the head of an occupant toward the outside in the vehicle width direction when a rollover occurs is well supported by the cylindrical front deployment portion that extends in the vertical direction interfering with the side pillar.

Furthermore, the curtain air bag system having the structure described above may also include a gas producing portion, and a gas flow path that deploys along an upper edge portion of the opening and through which flows gas supplied from the gas producing portion to the first deployment portion and the second deployment portion. The front deployment portion of the second deployment portion may include a front delay deployment portion that deploys later than the front seat deployment portion of the first deployment portion by gas being supplied through the gas flow path and a narrowed flow path.

In this case, with the curtain air bag system, the front delay deployment portion that forms at least a portion of the front deployment portion of the second deployment portion deploys later than the first deployment portion. As a result, the first deployment portion is able to finish being deployed earlier according to the volume of the front delay deployment portion. Meanwhile, the head of an occupant seated in the front seat is able to be well protected by the front delay deployment portion against a rollover in which the time from when a rollover is detected or a side collision occurs until head protection for an occupant seated in the front seat begins is long.

Moreover, the front delay deployment portion may deploy in a cylindrical shape extending in the vehicle vertical direction, overlapping with the front pillar when viewed from the side.

In this case, the reaction force for restricting movement of the head of an occupant toward the outside in the vehicle width direction is well supported by the front delay deployment portion interfering with the side door and the front pillar. As a result, the head of an occupant seated in the front seat is able to be even better protected when a rollover occurs.

In the curtain air bag system having the structure described above, the first deployment portion may include a back seat deployment portion that deploys beside an occupant in a vehicle back seat, the second deployment portion may include a rear deployment portion that deploys between the back seat deployment portion and the center pillar, and the rear deployment portion may include a rear delay deployment portion that deploys later than the back seat deployment portion by gas being supplied from the back seat deployment portion through a narrowed flow path.

In this case, an occupant seated in the back seat is protected against a side collision by the back seat deployment portion that forms the first deployment portion, and is protected against a rollover by the back seat deployment portion and the rear deployment portion that forms the second deployment portion. Here, the rear delay deployment portion that forms at least a portion of the rear deployment portion deploys later than the first deployment portion. This contributes to the first deployment portion (i.e., the back seat deployment portion) being able to finish deploying earlier according to the volume of the rear delay deployment portion. Meanwhile, the head of an occupant seated in the back seat is able to be well protected by the rear delay deployment portion against a rollover in which the time from when a rollover is detected or a side collision occurs until head protection for an occupant seated in the back seat begins is long.

Moreover, in the curtain air bag system having the structure described above, a ratio of a volume of the front delay deployment portion and the rear delay deployment portion of the second deployment portion to a volume of a remaining portion of the curtain air bag may be set to 1:4 to 1:5, inclusive.

In this case, because the ratio of the volume of the front and rear delay deployment portions to the volume of the remaining portion of the curtain air bag is 1:4 to 1:5, inclusive, the internal pressure of the front and rear delay deployment portions that deploy later (i.e., after a delay) can be made a pressure that is equal to or greater than an internal pressure that is required when a rollover occurs.

In the curtain air bag system according to the first aspect, the first deployment portion may have no seam that restricts deployment thickness in a vehicle width direction, in a region surrounded by a first line that extends in a vehicle longitudinal direction and passes through an uppermost striking point, from among a plurality of impactor striking points of a rollover test, and a second line that extends in a vehicle longitudinal direction and passes through a lowermost striking point, from among the plurality of impactor striking points.

With the curtain air bag system having the structure described above, the striking point of an impactor is positioned in an area where the curvature radius is large, i.e., where the tension of the deployment portion is high, by there being no seam in the first deployment portion. As a result, the head of an occupant is able to be well protected against a rollover by the first deployment portion.

In the curtain air bag system having the structure described above, the first deployment portion may deploy such that an apex that protrudes farthest inward in the vehicle width direction is positioned in a region that is surrounded by the first line and the second line.

In the curtain air bag system having the structure described above, the first deployment portion may deploy such that an apex that protrudes farthest inward in the vehicle width direction is positioned within a range of ±50 mm in a vertical direction with respect to a third line that extends in a vehicle longitudinal direction and passes through the middle portion between the first line and the second line.

In the curtain air bag having the structure described above, the first deployment portion may deploy such that an apex that protrudes farthest inward in the vehicle width direction is aligned with a third line that extends in a vehicle longitudinal direction and passes through the middle portion between the first line and the second line.

In all of these cases, with the curtain air bag system, the striking point of the impactor is positioned in an area where the curvature radius of the base cloth in the first deployment portion is large, i.e., in an area where the tension is high. As a result, the head of an occupant is able to be well protected against a rollover by the first deployment portion.

The curtain air bag system according to the first aspect may also include a gas producing portion, and a gas flow path that deploys along an upper edge portion of the opening above the first deployment portion, and through which flows gas supplied from the gas producing portion to the first deployment portion and the second deployment portion. The first deployment portion may be divided from the gas flow path by a seam arranged at a front portion, in the vehicle longitudinal direction, of the gas flow path and a seam arranged at a rear portion, in the vehicle longitudinal direction, of the gas flow path. Also, gas may flow into the first deployment portion from the gas flow path by passing between the two seams.

In the curtain air bag system having the structure described above, gas produced by the gas producing portion is supplied through the gas flow path to the second deployment portion and the first deployment portion that is arranged below the gas passage. Here, the first deployment portion that is divided from the gas flow path has a generally uniform sectional shape in the longitudinal direction. As a result, good occupant head protection performance can be obtained at each portion of the first deployment portion in the longitudinal direction.

As described above, the curtain air bag according to the invention is extremely effective for improving occupant protection performance when a vehicle rolls over.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a chart showing the change over time in the internal pressure of each portion of the curtain air bag system according to the example embodiment of the invention.

DETAILED DESCRIPTION OF EMBODIMENTS

Figure 1:
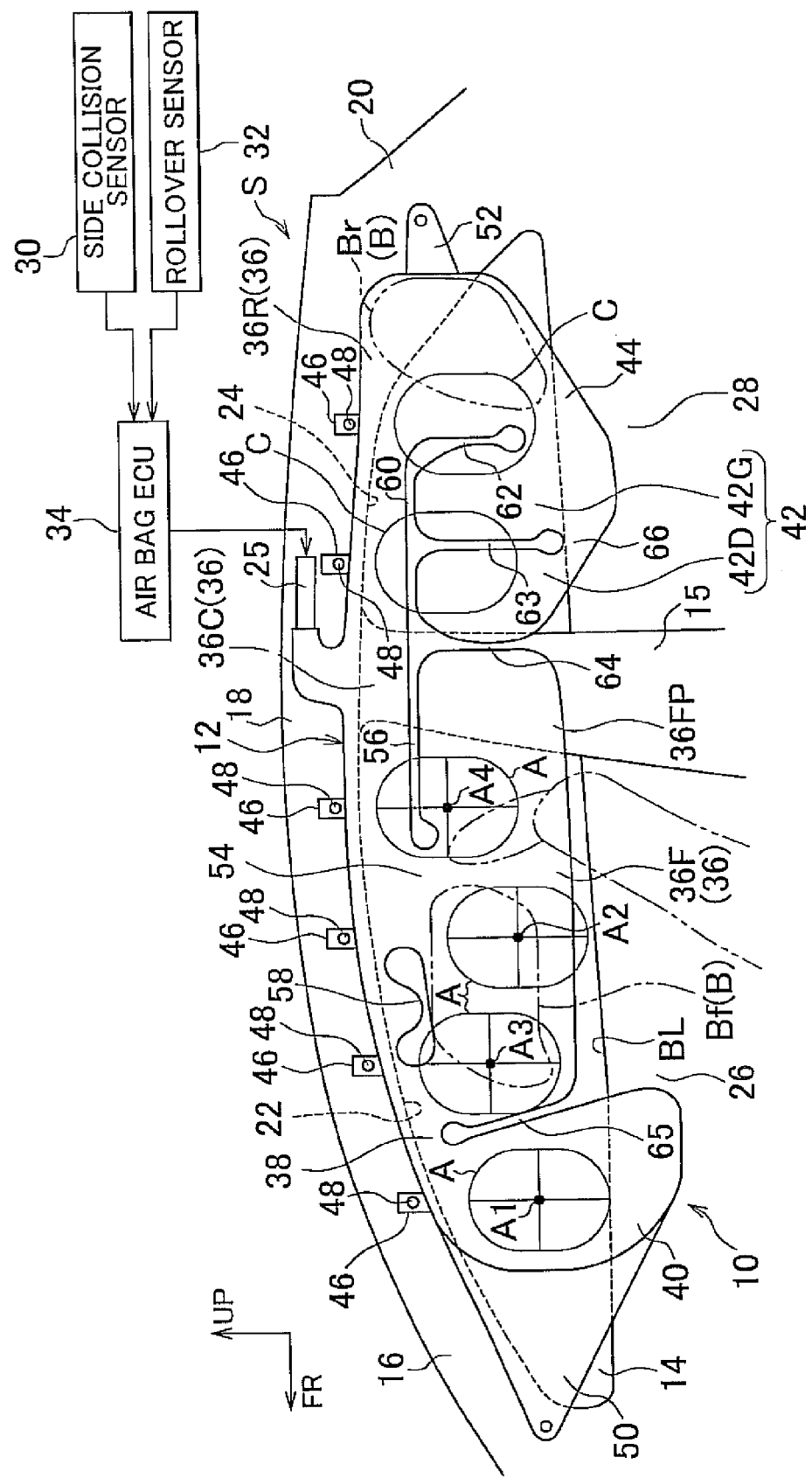
FIG. 1 is a side view, as viewed from the inside of a vehicle cabin, of the general overall structure of a curtain air bag system according to an example embodiment of the invention.

A curtain air bag system 10 according to an example embodiment of the invention will now be described with reference to FIGS. 1 to 5. The arrows FR, UP, IN, and OUT shown as appropriate in the drawings indicate the directions front (i.e., advancing), up, inside in the vehicle width direction, and outside in the vehicle width direction, respectively, with respect to a vehicle S to which the curtain air bag system 10 has been applied. Hereinafter, in descriptions using simply the longitudinal and vertical directions, these will be indicated as front or back (rear) in the longitudinal direction of the vehicle and up or down in the vertical direction of the vehicle, unless otherwise specified.

FIG. 1 is a side view, as viewed from inside the vehicle cabin, of the vehicle S to which the curtain air bag system 10 has been applied. As shown in the drawing, the curtain air bag system 10 includes a curtain air bag 12. The curtain air bag 12 is formed so as to deploy in the shape of a curtain along a side window glass 14 and a center pillar (B-pillar) 15 that serve as the inside portion of the vehicle cabin. In this example embodiment, the curtain air bag 12 is structured so as to cover the front and back side window glass 14 positioned next to a front seat and a back seat.

Although not shown, the curtain air bag 12 is housed rolled up or folded up accordion style, for example, in a long shape, from a front pillar (A-pillar) 16 to near a rear pillar 20 along a roof side portion 18. In a predetermined case that will be described later, the curtain air bag 12 will protect the head of an occupant seated in a front seat or a back seat by deploying along the front and back side window glass 14 and center pillar 15, as shown in FIG. 1. The roof side portion 18 in this example embodiment forms an upper edge of front and back door openings 22 and 24 that serve as openings for getting into and out of the vehicle that are surrounded by the roof side portion 18, the front pillar 16, the center pillar 15, and the rear pillar 20. The curtain air bag 12 is housed between a roof side rail and a roof headlining that form the roof side portion 18.

Also, the curtain air bag system 10 includes an inflator 25 that serves as a gas producing portion for supplying gas into the curtain air bag 12. The inflator 25 is a combustion type inflator or a cold gas type inflator, and supplies gas produced when activated into the curtain air bag 12. A gas injection port of the inflator 25 is communicated with the inside of the curtain air bag 12. In this example embodiment, the inflator 25 is arranged in the roof side portion 18. The shape of the curtain air bag 12 when deployed (i.e., the deployed shape) and the arrangement of the inflator 25 will be described later.

The curtain air bag 12 and the inflator 25 described above are each provided on both sides of in the vehicle width direction of the vehicle S. That is, the curtain air bag system 10 includes a pair of one curtain air bag 12 and one inflator 25 on both the left and right sides. Furthermore, the curtain air bag system 10 includes an air bag ECU 34 that is electrically connected to both a side collision sensor 30 and a rollover sensor 32, as shown in FIG. 1. The side collision sensor 30 predicts or detects (the inevitability of) a side collision of the vehicle S, and outputs a side collision detection signal to the air bag ECU 34. The rollover sensor 32 predicts or detects (the inevitability of) a rollover of the vehicle S, and outputs a rollover detection signal (hereinafter simply referred to as a "R/O detection signal") to the air bag ECU 34.

The air bag ECU 34 is electrically connected to both the left and right inflators 25 (only the connection with one inflator 25 is shown in FIG. 1). Upon receiving a side collision detection signal, the air bag ECU 34 activates the inflator 25 on the side of the side collision (i.e., the near side). Therefore, when the vehicle S is collided with in a side collision, the curtain air bag 12 on the near side receives a supply of gas, and consequently inflates and deploys. Also, upon receiving a R/O detection signal, the air bag ECU 34 activates the inflator 25 on both sides in the vehicle width direction. Upon receiving a R/O detection signal after a side collision, the air bag ECU 34 activates the inflator 25 on the side opposite the side collision side that is already activated.

Hereinafter, the structure of the curtain air bag 12 will be described in detail. Unless otherwise specified, the structure (i.e., shape) of the curtain air bag 12 when inflated and deployed will be described. As shown in FIG. 1, the curtain air bag 12 includes a main chamber 36 that serves as a first deployment portion, a front auxiliary chamber 40 that is communicated with the main chamber 36, and a rear auxiliary chamber 42 that is communicated with the main chamber 36. In this example embodiment, the front auxiliary chamber 40 and the rear auxiliary chamber 42 serve as a second deployment portion of the invention.

The main chamber 36 inflates and deploys in an area where the head is protected against a side collision (see area B in FIG. 1). More specifically, the main chamber 36 includes a front main chamber 36F, a rear main chamber 36R, and a gas supply passage 36C. The front main chamber 36F inflates and deploys so as to cover an area that includes an area Bf for the front seat where the head is protected against a side collision. The rear main chamber 36R inflates and deploys so as to cover an area that includes an area Br for the back seat where the head is protected against a side collision. The gas supply passage 36C communicates the front main chamber 36F with the rear main chamber 36R along the roof side portion 18. The front main chamber 36F serves as a front seat deployment chamber, the rear main chamber 36R serves as a back seat deployment chamber, and the gas supply passage 36C serves as a gas supply passage.

The inflator 25 is arranged so as to supply gas from a substantially center portion of the gas supply passage 36C. That is, the inflator 25 is arranged between the front main chamber 36F that is the front portion of the curtain air bag 12 and the rear main chamber 36R that is the rear portion of the curtain air bag 12. The inflator 25 may also be arranged in the center pillar 15 or the rear pillar 20 (the C-pillar or the D-pillar).

The front auxiliary chamber 40 deploys forward of the front main chamber 36F and forms a front end portion of the curtain air bag 12 that protects the head of an occupant seated in the front seat, forward of the front seat, when a rollover occurs. When viewed from the side, the upper end portion of the front auxiliary chamber 40 overlaps with the front pillar 16, and the lower end portion of the front auxiliary chamber 40 is positioned below a beltline BL and overlaps with the front portion of a front side door 26.

Figure 4:
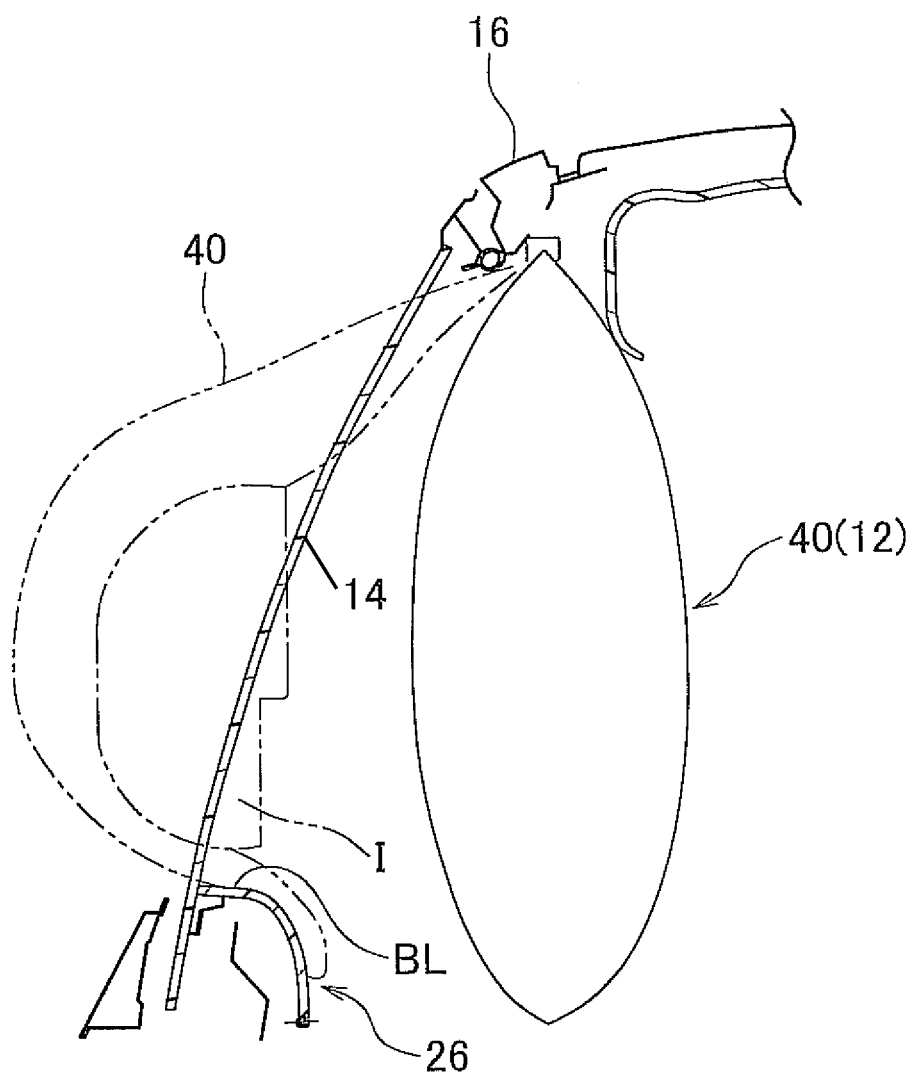
FIG. 4 is an enlarged sectional view showing the sectional shape in the vehicle width direction of a front auxiliary chamber that forms part of the curtain air bag system according to the example embodiment of the invention.

In this example embodiment, the upper portion of the front auxiliary chamber 40 is communicated with a front end of the gas supply passage 36C that deploys along the roof side portion 18, via a narrowed passage 38 of the curtain air bag 12. As shown in FIG. 4 that is a front sectional view, the front auxiliary chamber 40 deploys in a generally (long vertical) cylindrical shape having a center axis in the vertical direction.

Figure 2:
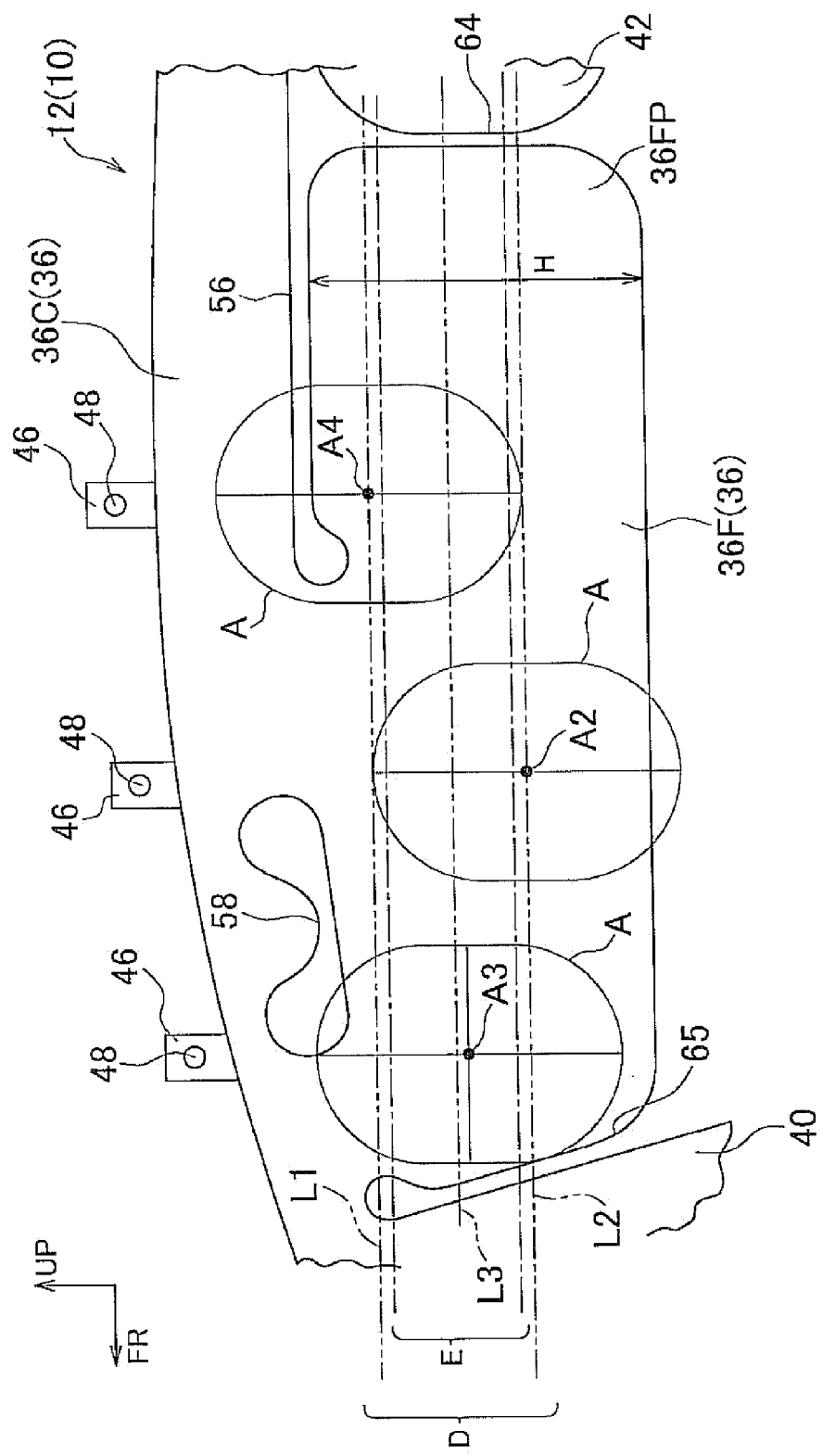
FIG. 2 is an enlarged side view of a front main chamber that forms part of the curtain air bag system according to the example embodiment of the invention.

Here, regions A shown by the thin solid lines in FIGS. 1 and 2 indicate test points (i.e., impactor striking points or striking points) corresponding to the head of an occupant at the front seat that are struck by an impactor I (see FIG. 4) in a rollover test (FMVSS No. 226). With the curtain air bag 12, the frontmost test point in the rollover test is covered by this front auxiliary chamber 40. The other test points with respect to an occupant seated in the front seat in the rollover test are covered by the front main chamber 36F.

The rear auxiliary chamber 42 deploys forward of the rear main chamber 36R, and forms a portion between the rear main chamber 36R and the front main chamber 36F. In this example embodiment, a portion of the lower end portion of the rear auxiliary chamber 42 is communicated with a front lower portion of the rear main chamber 36R via a gas passage 44. Also, a front end of the rear auxiliary chamber 42 in this example embodiment is divided from a rear end portion of the front main chamber 36F by a seam 64 that will be described later.

Further, the upper end side of the rear auxiliary chamber 42 is joined (i.e., connected) to a lower edge portion of the gas supply passage 36C via a seam 60 that will be described later, and the lower end side of the rear auxiliary chamber 42 deploys overlapping with a rear side door 28. Thus, the rear auxiliary chamber 42 protects the head of an occupant seated in the back seat, forward of the back seat, when a rollover occurs.

More specifically, regions C shown by the thin solid lines in FIG. 1 indicates test points (i.e., striking points) at the back seat that are struck by the impactor I in a rollover test (FMVSS No. 226). With the curtain air bag 12, the front-most test point at the back seat in the rollover test is covered by the rear auxiliary chamber 42. At this front-most test point, the lower end portion of the rear auxiliary chamber 42 that is communicated at the upper end with the gas supply passage 36C is caught by (i.e., abuts against) the rear side door 28, thereby suppressing displacement of the head of the occupant toward the outside in the vehicle width direction when a rollover occurs. A rear-most test point with respect to an occupant seated in the back seat in the rollover test is covered by the rear main chamber 36R and the rear auxiliary chamber 42. An intermediate test point is not shown in FIG. 1.

Also, as shown in FIG. 1, a plurality of attaching strips 46 are provided along the upper edge of the curtain air bag 12. The attaching strips 46 of the curtain air bag 12 are fixed to the vehicle body frame (i.e., the front pillar 16, the roof side portion 18, and the rear pillar 20) by fixing implements 48 such as clips or nuts and bolts that pass through the attaching strips 46.

The front end of the curtain air bag 12, i.e., the front auxiliary chamber 40, is supported by a lower portion of the front pillar 16 via a support cloth (i.e., tension cloth) 50 that is generally triangular when viewed from the side. Also, the rear end of the curtain air bag 12, i.e., the rear main chamber 36R, is supported by the rear pillar 20 via a support cloth 52.

Also, in the curtain air bag 12, a weave sealing process such as a silicon coat is applied to at least the surface of the base cloth that forms the front auxiliary chamber 40, such that the internal pressure is easily maintained. In this example embodiment, a silicon coat is applied to the surface of the base cloth that forms the front auxiliary chamber 40 and the rear auxiliary chamber 42.

The front main chamber 36F that forms part of the curtain air bag 12 described above is configured to deploy in a cylindrical shape that extends in the longitudinal direction. This will be described in detail below.

As shown in FIGS. 1 and 2, the front main chamber 36F is arranged below the gas supply passage 36C that extends along the roof side portion 18 to the front auxiliary chamber 40. The front main chamber 36F is configured to receive a supply of gas from the gas supply passage 36C through the gas passage 54 that is positioned in a substantially center portion in the longitudinal direction of the front main chamber 36F. At the front portion of the gas passage 54, the gas supply passage 36C is divided (i.e., separated) from the front main chamber 36F by the seam 58. At the rear portion of the gas passage 54, the gas supply passage 36C is divided (i.e., separated) from the front main chamber 36F by the seam 56. The seam 58 and seam 56 provide a narrowed opening used to define the gas passage 54. The gas passage 54 is located adjacent the first deployment portion and is spaced apart from the center pillar 15 when viewed from the side of the vehicle.

The rear seam 56 is connected to a seam 60 that divides the gas supply passage 36C from the rear auxiliary chamber 42, a seam 62 that divides the rear main chamber 36R from the rear auxiliary chamber 42, a seam 63 that divides a delay chamber 42D from a general portion 42G that will be described later, and a seam 64 that divides the rear auxiliary chamber 42 from the front main chamber 36F. Meanwhile, the front seam 58 is arranged between the upper end of the seam 65 that divides the front auxiliary chamber 40 from the front main chamber 36F, and the front end of the seam 56, and separated from the seams 65 and 56. That is, the front seam 58 is formed (i.e., arranged) like a floating island.

Thus, the front main chamber 36F is configured to deploy in a long cylindrical shape in the longitudinal direction, below the gas supply passage 36C, i.e., below the seams 56 and 58. The rear end side of the front main chamber 36F is a pillar wrap portion 36FP that overlaps with the center pillar 15 when viewed from the side.

Here, the deployment shape of the front main chamber 36F is set by the relationship between the impactor striking points of the rollover test (FMVSS No. 226). With the impactor striking points (the center points of regions A) for the front seat of the vehicle in this example embodiment made striking points A1, A2, A3, and A4, as shown in FIGS. 1 and 2, the deployment shape of the front main chamber 36F is set by the relationship between striking points A2 to A4 that are covered by the front main chamber 36F.

More specifically, as shown in FIG. 2, imagining a first line L1 that is a virtual line that extends in the longitudinal direction (i.e., the horizontal direction) and passes through the striking point A4 that is the uppermost striking point of the striking points A2 to A4, and a second line L2 that is a virtual line that extends in the longitudinal direction (i.e., the horizontal direction) and passes through the striking point A2 that is the lowermost striking point of the striking points A2 to A4, the front main chamber 36F is configured such that there is no seam in region D between the first line L1 and the second line L2.

Figure 3:
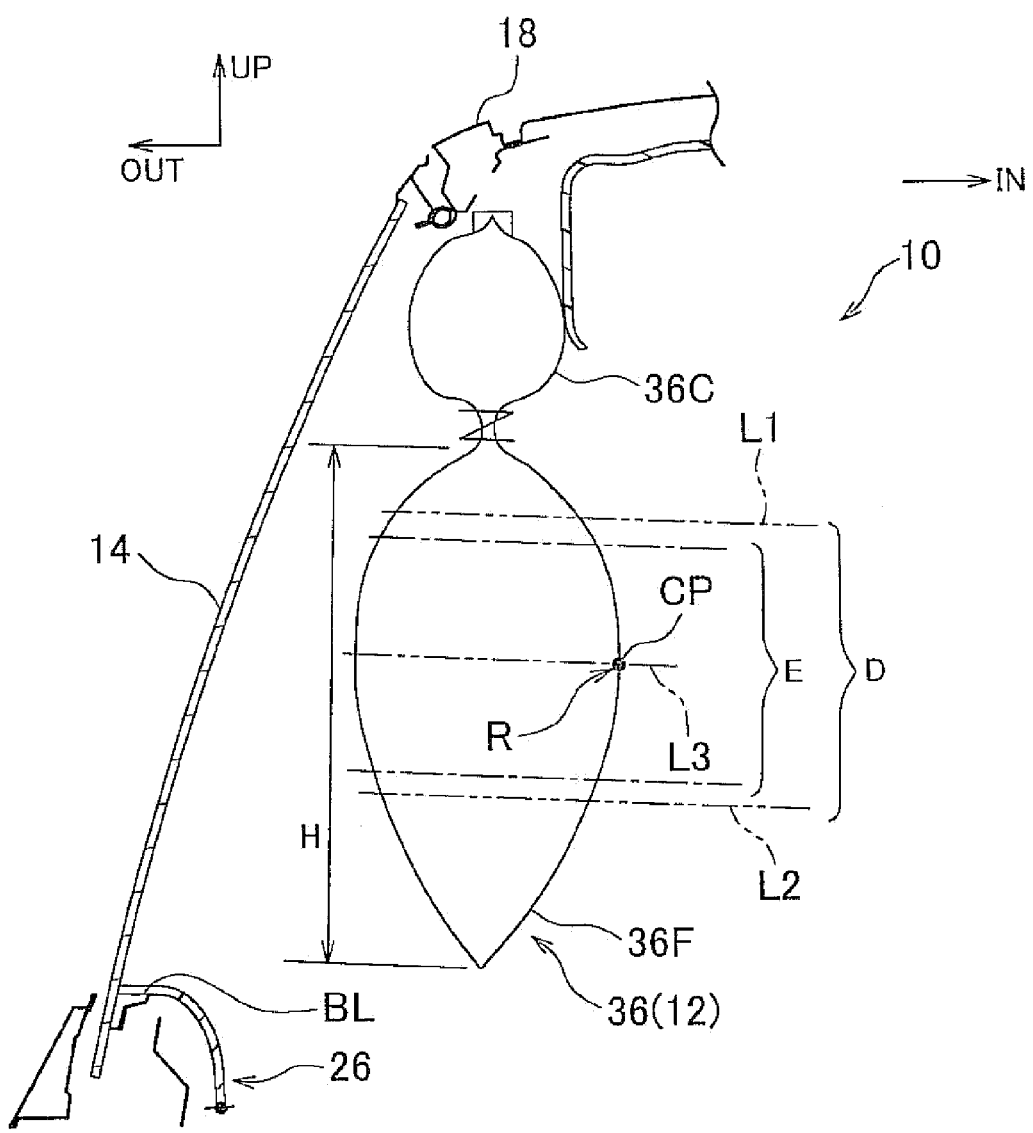
FIG. 3 is an enlarged sectional view showing the sectional shape in the vehicle width direction of the front main chamber that forms part of the curtain air bag system according to the example embodiment of the invention.

Also, as shown in FIG. 3, the deployment shape of the front main chamber 36F is set such that an apex CP that protrudes farthest toward the inside in the vehicle width direction of each portion in the longitudinal direction of the vehicle is positioned within region D. In this example embodiment, the position of the apex CP of the front main chamber 36F is set to be within the range of region E that is ±50 mm in the vertical direction with respect to a third line L3 that is a virtual line that is parallel to the first line L1 and the second line L2 and passes through the middle portion between the first line L1 and the second line L2, at each portion in the longitudinal direction of the vehicle. The magnitude relation in the vertical direction of region D and region E may be switched according to the type of vehicle. In this example embodiment, the deployment shape of the front main chamber 36F is set such that the apex CP of the front main chamber 36F is aligned with the third line L3 at each portion in the longitudinal direction of the vehicle.

With the curtain air bag 12 of this example embodiment, the front auxiliary chamber 40 that forms the front deployment portion of the second deployment portion is set as a delay chamber. The front auxiliary chamber 40 serves as a front delay deployment portion. That is, in this example embodiment, the entire front deployment portion of the second deployment portion serves as a front delay deployment portion. As described above, when viewed from the side, the upper end side of the front auxiliary chamber 40 overlaps with the front pillar 16, and the lower end side of the front auxiliary chamber 40 overlaps with the front portion of the front side door 26.

Also, with the curtain air bag 12, a portion of the rear auxiliary chamber 42 that forms the rear deployment portion of the second deployment portion is set as the delay chamber 42D. The delay chamber 42D serves as a rear delay deployment portion. More specifically, the rear auxiliary chamber 42 is formed by the delay chamber 42D and the general portion 42G that deploys together with the rear main chamber 36R. That is, in this example embodiment, a portion of the rear deployment portion of the second deployment portion serves as the rear delay deployment portion. The volume ratio of the delay chamber to the portion other than the delay chamber is set as will be described later, and the presence or absence of the delay chamber 42D, and the volume thereof if present, are set to match that volume ratio. Therefore, the rear auxiliary chamber 42 may be formed without a delay chamber, or the entire rear auxiliary chamber 42 may be a delay chamber.

By setting the narrowed passage 38 between the front auxiliary chamber 40 and the gas supply passage 36C (front main chamber 36F), the inflow of gas to the front auxiliary chamber 40 when the inflator 25 is first activated is limited, so the front auxiliary chamber 40 deploys later than the main chamber 36. In other words, the narrowed passage 38 is configured such that the gas flow resistance (i.e., the pressure loss) is greater than that of the gas passage 54 and the like, so that the front auxiliary chamber 40 will inflate and deploy at a later time than the main chamber 36. Therefore, in the structure of this example embodiment, the inside diameter of the narrowed passage 38 is set to be within a range of 40 mm to 70 mm (55 mm in this example embodiment).

Similarly, the delay chamber 42D will inflate later than the main chamber 36 and the general portion 42G by the gas from the inflator 25 being supplied from the general portion 42G of the rear auxiliary chamber 42, through a narrowed passage 66 that has an inside diameter of 40 mm to 70 mm (55 mm in this example embodiment).

Here, a description of the deployment of the curtain air bag 12 that includes the front auxiliary chamber 40 and the delay chamber 42D that are delay chambers will be added with reference to FIG. 5. As shown in FIG. 5, the main chamber 36 and the general portion 42G of the rear auxiliary chamber 42 (hereinafter, also referred to simply as the main chamber 36 and the like) of the curtain air bag 12 finish deploying at time t1 that is approximately 35 milliseconds after a side collision signal is input from the side collision sensor 30, i.e., after time t0 at which time the inflator 25 is activated.

When a side collision occurs, protection of the head of the occupant by the main chamber 36 of the curtain air bag 12 ends by time t2 that is approximately 100 milliseconds after time t0. The delay chamber 40 is set (in terms of design aim) to effectively start to inflate from this time t2. With this curtain air bag system 10, the delay chamber 40 is configured (i.e., designed) to start to inflate after time t2 by making the inside diameter of the narrowed passages 38 and 66 within a range from 40 mm to 70 mm as described above.

Therefore, with the curtain air bag system 10, the delay chamber 40 and the delay chamber 42D inflate and deploy after the occupant is finished being protected by the main chamber 36 when a side collision occurs. A rollover of the vehicle S due to a side collision occurs from between approximately 1.5 seconds (time t4) to approximately 6 seconds (time t5) after time t0, and a rollover of the vehicle S that is not due to a side collision occurs from between approximately 1.5 seconds to approximately 6 seconds after a R/O detection signal is output from the rollover sensor 32 (i.e., after time t0 that is the point at which the inflator 25 is activated), so protection against a rollover of the vehicle S by the curtain air bag 12 is required during that time.

To protect the head of the occupant from the rollover, the curtain air bag 12 is configured to maintain an internal pressure of equal to or greater than a required pressure (such as 25 kPa) from time t0 until time t5. Also, to protect the occupant from the side collision, the curtain air bag 12 is configured such that the internal pressure of the main chamber 36 is equal to or greater than another required pressure (such as 40 kPa) from time t0 until time t2. The structure in which required internal pressures are able to be maintained for the required periods of time in this way is obtained by setting the volume ratio of a volume Vd that is the sum of the volume of the front auxiliary chamber 40 and the volume of the delay chamber 42D that are delay chambers, to a volume Vg of the main chamber 36 and the like.

More specifically, with the curtain air bag 12, Vd:Vg is set to be within a range of 1:4 to 1:5, inclusive. In other words, the volume ratio Rv (=Vd/Vt) of the delay chamber to the total volume Vt (=Vd+Vg) of the curtain air bag 12 is set to be no less than $\frac{1}{6}$ and no more than $\frac{1}{5}$. In this example embodiment, Vd:Vg=1:4, i.e., $\frac{1}{6} \leq Rv \leq \frac{1}{5}$.

This volume ratio will be described below with reference to FIG. 5. FIG. 5 is a chart showing a representative change over time in the internal pressure of the curtain air bag 12, and does not show the actual change in internal pressure.

As described above, in order to protect the head of an occupant when a side collision occurs (from time t0 to time t2), a bag internal pressure (P0) of no less than 40 kPa, for example, is necessary for the volume Vg of the main chamber 36 and the general portion 42G of the rear auxiliary chamber 42. On the other hand, in order to protect the head of an occupant when a rollover occurs, a bag internal pressure (P2) of no less than 25 kPa, for example, is necessary for the total volume of the curtain air bag 12.

Here, as shown in FIG. 5, considering that the internal pressure of the curtain air bag 12 decreases approximately 20% over time from time t3 to time t4, the internal pressure (P1) for the total volume of the curtain air bag 12 before this decrease (time t3) must be at least 31.25 kPa, i.e., 125% of 25 kPa. Also, considering that the volume of the curtain air bag 12 at time t3 increases from the volume Vg by the amount of the volume Vd, P1=P0× Vg/(Vg+Vd)=P0× Vg/Vt.

Therefore, if P1=31.25 kPa and P0=40 kPa, then Vg/Vt=P1/P0≈0.8, and Vt:Vd:Vg≈5:1:4 (Vd/Vg≈¼). Also, when the internal pressure P2 when a rollover occurs is set slightly larger than 25 kPa, Vd/Vt becomes smaller. For example, when P1=27 kPa, Vt:Vd:Vg≈6:1:5.

Accordingly, with the curtain air bag system 10, the main chamber 36 deploys at 40 kPa, for example, in the period from time t0 to time t2, and the entire curtain air bag 12 deploys with an internal pressure of at least 25 kPa, for example, in the period from time t2 to time t5, all by the supply of gas from the single inflator 25.

Next, the operation of the first example embodiment will be described.

With the curtain air bag system 10 of the structure described above, when the vehicle S with the vehicle air bag system 10 sustains a side collision, the air bag ECU 34 that has received a side collision detection signal from the side collision sensor 30 activates the inflator 25 on the side where the side collision occurred (time t0). Accordingly, the curtain air bag 12 receives a supply of gas from the inflator 25 and consequently inflates, such that the main chamber 36, i.e., the front main chamber 36F and the rear main chamber 36R, of the curtain air bag 12 deploys (time t1). As a result, the head of an occupant seated in the front seat when a side collision occurs is protected by the front main chamber 36F, and the head of an occupant seated in the back seat when a side collision occurs is protected by the rear main chamber 36R. This protection against a side collision finishes by time t2.

Also, if the vehicle S rolls over after a side collision, the air bag ECU 34, that receives a R/O detection signal from the rollover sensor 32 activates the inflator 25 on the side opposite the side of the side collision. On the other hand, if the vehicle S rolls over independent of a side collision, the air bag ECU 34 that receives a R/O detection signal from the rollover sensor 32 activates the inflator 25 on both the left and right sides of the vehicle. As a result, the curtain air bag 12 will deploy on both sides in the vehicle width direction; so the head of the occupant will be protected against a rollover (time t4 to time t5). The front auxiliary chamber 40 and the delay chamber 42D that are delay chambers finish deploying by time t3 after the inflator 25 is activated (i.e., time t0).

Also, when the head of an occupant is protected by the front auxiliary chamber 40 when a rollover occurs, the front auxiliary chamber 40 of which the upper end side overlaps with the front pillar 16 and the lower end side overlaps with the front side door 26 inhibits the head of an occupant in the front seat (i.e., the impactor I) from being displaced toward the outside in the vehicle width direction by the upper and lower ends of the front auxiliary chamber 40 being caught by (i.e., abutting against) the front side door 26 (see the virtual lines in FIG. 4).

Here, with the curtain air bag system 10, the front main chamber 36F forms a long cylinder shape in the longitudinal direction that has the pillar wrap portion 36FP on the rear end side. Therefore, the head of an occupant seated in the front seat is able to be effectively inhibited from moving toward the outside in the vehicle width direction when a rollover occurs. That is, an occupant seated in the front seat is able to be well protected against a rollover. In particular, the front main chamber 36F is divided from the gas supply passage 36C by the seam 58 at the front portion of the gas passage 54 and by the seam 56 at the rear portion of the gas passage 54, so the front main chamber 36F has a generally uniform sectional shape at each portion in the longitudinal direction. Therefore, the front main chamber 36F displays excellent occupant protection performance at each portion (i.e., at each portion including the striking points A2 to A4) in the longitudinal direction.

Also, the front main chamber 36F does not have a seam in region D between the first line L1 and the second line L2, so compared to a comparative example in which there is a seam in this region D, the deployment height H (see FIGS. 2 and 3) in the vertical direction is high. That is, with the curtain air bag system 10, the curvature radius R (see FIG. 3) of the surface of the front main chamber 36F that is toward the center of the vehicle cabin (i.e., on the side where the head of an occupant would strike) is large compared with the comparative example.

Here, the tension T that is applied to the base cloth from which the front main chamber 36F is made is proportional to the curvature radius R and the internal pressure P. That is, T∝R×P. Therefore, with the air bag, the tension T of the base cloth increases with a greater the curvature radius R, even if the internal pressure and the deployment thickness do not change. Also, with the front main chamber 36F, the effect of inhibiting the head of an occupant from moving toward the outside in the vehicle width direction from a rollover increases with a greater tension T of the base cloth. Therefore, with the curtain air bag system 10, head protection performance for an occupant in the front seat by the front main chamber 36F with respect to a rollover is improved compared with the comparative example.

Moreover, the apex CP of the front main chamber 36F is aligned with the third line L3 in region E, so the head of the occupant is received by an area with a large curvature radius R at the front main chamber 36F that deploys more in the vertical direction than the vehicle width direction. Therefore, with the curtain air bag system 10, the front main chamber 36F further improves the head protection performance for an occupant in the front seat with respect to a rollover.

Furthermore, the front main chamber 36F is divided from the gas supply passage 36C by the seams 58 and 56 that are in front and back of the gas passage 54, so the front main chamber 36F has a generally uniform sectional shape at each portion in the longitudinal direction. Therefore, the high occupant protection performance described above is able to be obtained at each portion in the longitudinal direction.

Also, with the curtain air bag system 10, the front auxiliary chamber 40 forms a long cylindrical shape in the vertical direction. As a result, an occupant seated in the front seat is able to be effectively inhibited from moving toward the outside in the vehicle width direction by the vehicle cabin front end side (i.e., the portion that includes the striking point A1) when a rollover occurs, by the front auxiliary chamber 40 being caught by the front pillar 16 and the passage forming portion 26.

Further, with the curtain air bag system 10, the front auxiliary chamber 40 and the delay chamber 42D of the rear auxiliary chamber 42 are delay chambers, so the main chamber 36 is able to be inflated and deployed quickly (i.e., in a short amount of time) when a side collision occurs. That is, as shown in FIG. 5, with the comparative example in which no delay chamber is provided, the entire curtain air bag of the volume Vt must be deployed, so the time at which the entire curtain air bag finishes being deployed is later than the time at which the main chamber 36 (volume Vg) of the curtain air bag 12 finishes being deployed by Δt. Δt=(Vt/Vg−1)−t1.

Furthermore, as shown in FIG. 5, with the comparative example described above, the internal pressure P0 is not able to be obtained when protecting against a side collision. Therefore, with this comparative example, an inflator with a larger capacity than the inflator 25 is needed.

In contrast, with the curtain air bag system 10, the front auxiliary chamber 40 and the delay chamber 42D are set as described above, so the front main chamber 36F is able to finish being deployed early with the required internal pressure P0 when there is a side collision, by the inflator 25 that is of a relatively small capacity. Moreover, the volume ratio Rv of the volume Vd of the front auxiliary chamber 40 and the delay chamber 42D to the volume Vg of the main chamber 36 and the like is 1:4, so the required internal pressure P2 that is required when protecting against a rollover is able to be obtained at time t4 to time t5.

In the example embodiments described above, a delay chamber is provided in the curtain air bag 12, but the invention is not limited to this. For example, a delay chamber may also not be provided. In this case, in a relatively small vehicle, the front auxiliary chamber 40 is preferably integrated with the front main chamber 36F (i.e., the front auxiliary chamber 40 and the front main chamber 36F together form a single chamber). That is, the front main chamber 36F is able to cover all the way to a striking point corresponding to the striking point A1. With this structure, there is no seam in region D that is obtained taking into account the portion that covers the striking point corresponding to the striking point A1, and the deployment shape is such that the apex CP of the front main chamber 36F is positioned in region D, or in region E that is based on the third line L3 that is the center line of region D.

Also, in the example embodiments described above, the invention is applied to the vehicle S provided with the back seat and the rear side door 28, but the invention is not limited to this. For example, the invention may also be applied to a two-door vehicle that has no rear side door 28, a two-seat vehicle that has no back seat, or a vehicle that has three or more rows of seats, or the like.

Further, in the example embodiments described above, the front auxiliary chamber 40 is rolled up or the like and housed inside the front pillar 16, but the invention is not limited to this. For example, the front auxiliary chamber 40 that is rolled up or the like may also be folded back at the front end side of the main chamber 36 and housed, together with the main chamber 36, in the roof side portion 18, or the front auxiliary chamber 40 that is rolled up or the like may be arranged in the roof along the front edge of the roof.

The curtain airbag may be woven by a Jacquard loom. That is, the airbag may be a one-piece woven airbag. In the one-piece woven curtain airbag, portions to be a seam are woven together and each chamber of the curtain airbag is defined by the woven texture of the seam. A seam may be formed by sewing two foundation clothes.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A curtain air bag system comprising a curtain air bag that is housed folded up in an upper edge portion of an opening for getting into and out of a vehicle in a side of a vehicle body, and that includes a first deployment portion, a gas flow path, and a second deployment portion,
    wherein the first deployment portion inflates by receiving a supply of gas when the vehicle is collided with in a side collision as well as when the vehicle rolls over, and deploys in a cylindrical shape having a longitudinal axis extending in a vehicle longitudinal direction, such that an entirety of the first deployment portion deploys above a belt line such that a rear most end of the first deployment portion overlaps with a center pillar when viewed from the side of the vehicle body,
    the gas flow path supplies gas to the first deployment portion from a gas passage located adjacent the first deployment portion, the gas passage is spaced apart from the center pillar when viewed from the side of the vehicle body, and
    the second deployment portion, in response to receiving a supply of gas, deploys such that a lower end extends below the belt line, in a position not overlapping with the first deployment portion when viewed from the side, at least when the vehicle rolls over.

2. The curtain air bag system according to claim 1, further comprising:
    a gas producing portion that supplies the supply of gas; and
    a gas flow path that deploys along an upper edge portion of the opening above the first deployment portion, and through which flows the supply of gas supplied from the gas producing portion to the first deployment portion and the second deployment portion,
    wherein the first deployment portion is divided from the gas flow path by a seam arranged at a front portion, in the vehicle longitudinal direction, of the gas flow path and a seam arranged at a rear portion, in the vehicle longitudinal direction, of the gas flow path; and the supply of gas flows into the first deployment portion from the gas flow path by passing between the two seams.

3. The curtain air bag system of claim 1 wherein the gas passage located adjacent the first deployment portion is defined by a narrowed opening through which gas flows directly into the first deployment portion.

4. The curtain air bag system according to claim 1, wherein the first deployment portion includes a front seat deployment portion that deploys in a cylindrical shape extending in the vehicle longitudinal direction beside an occupant in a vehicle front seat and above the belt line, such that a rear end side of the first deployment portion in the vehicle longitudinal direction overlaps with the center pillar when viewed from the side; and the second deployment portion includes at least a front deployment portion that deploys in a cylindrical shape extending in a vertical direction, in front of the front seat deployment portion and below a front pillar.

5. The curtain air bag system according to claim 4, further comprising:
    a gas producing portion that supplies the supply of gas;
    wherein the gas flow path deploys along an upper edge portion of the opening and through which flows the supply of gas supplied from the gas producing portion to the first deployment portion and the second deployment portion,
    wherein the front deployment portion of the second deployment portion includes a front delay deployment portion that deploys later than the front seat deployment portion of the first deployment portion by the supply of gas being supplied through the gas flow path and a narrowed flow path.

6. The curtain air bag system according to claim 5, wherein the front delay deployment portion deploys in a cylindrical shape extending in the vehicle vertical direction, overlapping with the front pillar when viewed from a side.

7. The curtain air bag system according to claim 1, wherein the first deployment portion has no seam that restricts deployment thickness in a vehicle width direction, in a region surrounded by a first line that extends in a vehicle longitudinal direction and passes through an uppermost striking point, from among a plurality of impactor striking points of a rollover test, and a second line that extends in a vehicle longitudinal direction and passes through a lowermost striking point, from among the plurality of impactor striking points.

8. The curtain air bag system according to claim 7, wherein the first deployment portion deploys such that an apex that protrudes farthest inward in the vehicle width direction is positioned in a region that is surrounded by the first line and the second line.

9. The curtain air bag system according to claim 7, wherein the first deployment portion deploys such that an apex that protrudes farthest inward in the vehicle width direction is positioned within a range of ±50 mm in a vertical direction with respect to a third line that extends in a vehicle longitudinal direction and passes through the middle portion between the first line and the second line.

10. The curtain air bag system according to claim 7, wherein the first deployment portion deploys such that an apex that protrudes farthest inward in the vehicle width direction is aligned with a third line that extends in a vehicle longitudinal direction and passes through the middle portion between the first line and the second line.

11. A curtain air bag system comprising a curtain air bag that is housed folded up in an upper edge portion of an opening for getting into and out of a vehicle in a vehicle body, and that includes a first deployment portion and a second deployment portion, wherein the first deployment portion inflates by receiving a supply of gas when the vehicle is collided with in a side collision as well as when the vehicle rolls over, and deploys in a cylindrical shape extending in a vehicle longitudinal direction, above a belt line so as to overlap with a center pillar when viewed from a side of the vehicle, and the second deployment portion, in response to receiving a supply of gas, deploys such that a lower end extends below the belt line, in a position not overlapping with the first deployment portion when viewed from the side, at least when the vehicle rolls over;

wherein the first deployment portion includes a front seat deployment portion that deploys in a cylindrical shape extending in the vehicle longitudinal direction beside an occupant in a vehicle front seat and above the belt line, such that a rear end side of the first deployment portion in the vehicle longitudinal direction overlaps with the center pillar when viewed from the side; and the second deployment portion includes at least a front deployment portion that deploys in a cylindrical shape extending in a vertical direction, in front of the front seat deployment portion and below a front pillar;

the air bag system further comprising a gas producing portion that supplies the supply of gas; and a gas flow path that deploys along an upper edge portion of the opening and through which flows the supply of gas supplied from the gas producing portion to the first deployment portion and the second deployment portion, wherein the front deployment portion of the second deployment portion includes a front delay deployment portion that deploys later than the front seat deployment portion of the first deployment portion by the supply of gas being supplied through the gas flow path and a narrowed flow path; and wherein the first deployment portion includes a back seat deployment portion that deploys beside an occupant in a vehicle back seat; the second deployment portion includes a rear deployment portion that deploys between the back seat deployment portion and the center pillar; and the rear deployment portion includes a rear delay deployment portion that deploys later than the back seat deployment portion by the supply of gas being supplied from the back seat deployment portion through a narrowed flow path.

12. The curtain air bag system according to claim 11, wherein a ratio of a volume of the front delay deployment portion and the rear delay deployment portion of the second deployment portion to a volume of a remaining portion of the curtain air bag is set to 1:4 to 1:5, inclusive.

13. A curtain air bag system comprising a curtain air bag that is housed folded up in an upper edge portion of an opening for getting into and out of a vehicle in a side of a vehicle body, and that includes a first deployment portion, a gas flow path, and a second deployment portion, wherein the first deployment portion inflates by receiving a supply of gas when the vehicle is collided with in a side collision as well as when the vehicle rolls over, and deploys in a cylindrical shape extending in a vehicle longitudinal direction, such that an entirety of the first deployment portion deploys above a belt line such that a rearward most end of the first deployment portion overlaps with a center pillar when viewed from the side of the vehicle body, the gas flow path supplies gas to the first deployment portion from a gas passage located adjacent the first deployment portion, the gas passage is spaced apart from the center pillar when viewed from the side of the vehicle body, and the second deployment portion, in response to receiving a supply of gas, deploys such that a lower end extends below the belt line, in a position not overlapping with the first deployment portion when viewed from the side, at least when the vehicle rolls over;

wherein the first deployment portion has no seam that restricts deployment thickness in a vehicle width direction, in a region surrounded by a first line that extends in a vehicle longitudinal direction and passes through an uppermost striking point, from among a plurality of impactor striking points of a rollover test, and a second line that extends in a vehicle longitudinal direction and passes through a lowermost striking point, from among the plurality of impactor striking points; and wherein the first deployment portion deploys such that an apex that protrudes farthest inward in the vehicle width direction is positioned within a range of ±50 mm in a vertical direction with respect to a third line that extends in a vehicle longitudinal direction and passes through the middle portion between the first line and the second line.

14. The curtain air bag system of claim 13 wherein the gas passage located adjacent the first deployment portion is defined by a narrowed opening through which gas flows directly into the first deployment portion.

* * * * *